United States Patent
Walter et al.

(10) Patent No.: US 12,518,781 B1
(45) Date of Patent: Jan. 6, 2026

(54) FORMING A HEAT CHANNEL ON A MAGNETIC WRITE POLE USING AN ADHESION LAYER

(71) Applicant: Seagate Technology LLC, Fremont, CA (US)

(72) Inventors: Jeffery James Walter, Lino Lakes, MN (US); Haiyu Fang, Chanhassen, MN (US); Jie Gong, Eden Prairie, MN (US); Tong Zhao, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/958,314

(22) Filed: Nov. 25, 2024

(51) Int. Cl.
*G11B 5/31* (2006.01)
*G11B 5/02* (2006.01)
*G11B 13/08* (2006.01)
*G11B 5/00* (2006.01)

(52) U.S. Cl.
CPC ............. *G11B 5/3106* (2013.01); *G11B 5/02* (2013.01); *G11B 5/3163* (2013.01); *G11B 13/08* (2013.01); *G11B 2005/0021* (2013.01)

(58) Field of Classification Search
CPC ........... G11B 5/09; G11B 5/00; G11B 5/3133; G11B 11/10505; G11B 27/36; G11B 2005/0021
USPC .......................................................... 360/59
See application file for complete search history.

(56) References Cited

U.S. PATENT DOCUMENTS

| | | | |
|---|---|---|---|
| 8,351,151 B2 * | 1/2013 | Katine | G11B 5/6088 360/110 |
| 8,923,100 B1 | 12/2014 | Wessel | |
| 9,218,835 B1 | 12/2015 | Sasaki | |
| 9,305,575 B2 | 4/2016 | Zhao | |
| 9,368,146 B2 | 6/2016 | Lee | |
| 10,192,577 B1 | 1/2019 | McGeehin | |
| 10,366,715 B1 | 7/2019 | Ramaswamy | |
| 10,438,617 B2 | 10/2019 | Gorantla | |
| 11,011,201 B2 | 5/2021 | Habibi | |
| 11,127,421 B1 | 9/2021 | Siangchaew | |
| 11,651,791 B2 | 5/2023 | Matsumoto | |

* cited by examiner

*Primary Examiner* — Nabil Z Hindi
(74) *Attorney, Agent, or Firm* — Mueting Raasch Group

(57) ABSTRACT

Described are write head constructions that may be useful in magnetic recording, and in particular for heat-assisted magnetic recording. Such write head constructions include a heat channel abutted to the write pole to facilitate transferring heat away from the write pole and other components near the media-facing surface of the write head. To help prevent diffusion of materials between the heat channel and the write pole, a diffusion barrier layer is provided. Properties such as thermal expansion mismatch, the presence of oxide in the diffusion barrier layer, and so forth, may lead to undesired delamination of the heat channel during fabrication of the write head and/or during operation. In accordance with the present disclosure, an adhesion layer may be provided between the diffusion barrier layer and the heat channel to improve adhesion of the heat channel and effectively reduce delamination.

18 Claims, 3 Drawing Sheets

FORMING A HEAT CHANNEL ON A MAGNETIC WRITE POLE USING AN ADHESION LAYER

TECHNICAL FIELD

The disclosure relates to magnetic write heads, particularly for heat-assisted magnetic recording.

SUMMARY

In accordance with certain aspects, the present disclosure describes write heads for magnetic recording on magnetic media positioned proximate to a media-facing surface of the write head. The described write heads include a write pole having a write pole tip extending to the media-facing surface, a heat channel abutted to at least the write pole tip of the write pole and configured to conduct heat away from the media-facing surface, a diffusion barrier layer disposed between the write pole tip and the heat channel, the diffusion barrier layer configured to substantially prevent interdiffusion of materials between the write pole tip and the heat channel, and an adhesion layer disposed between the diffusion barrier layer and the heat channel, the adhesion layer configured to substantially prevent delamination of the heat channel during exposure of the write head to elevated temperatures. The write head may be a heat-assisted magnetic recording (HAMR) write head, and thus provided with various HAMR components such as a near-field transducer and a waveguide. The heat channel may be positioned at a trailing edge of the write pole.

In certain aspects, the adhesion layer has a coefficient of thermal expansion that is within 50% of the coefficient of thermal expansion of the diffusion barrier layer and/or the heat channel.

In certain aspects, the write pole and write pole tip are made of an alloy of iron and cobalt. In certain aspects, the diffusion barrier layer is made of Ir, Pt, Rh, Ru, or Ta, and may further include an oxide. In certain aspects, the adhesion layer is made of Cr, Ir, Pt, Rh, Ta, Ti, Y, or Zr, and further may be substantially free of oxides. In certain aspects, the heat channel is made of Au. In certain aspects, a seed layer is disposed between the adhesion layer and the heat channel, and the seed layer may be made of Au, Ir, Pt, Ru, or Rh.

In accordance with certain aspects, the present disclosure also describes methods for making a magnetic write head. Such methods include forming a diffusion barrier layer over a write pole tip that extends to a media-facing surface of the magnetic write head, forming an adhesion layer over the diffusion barrier layer, and forming a heat channel over the adhesion layer. The diffusion barrier layer substantially prevents interdiffusion of materials between the write pole tip and the heat channel, and the adhesion layer substantially prevents delamination of the heat channel during exposure of the write head to elevated temperatures.

In certain aspects, the methods may further include performing an ashing step prior to forming the adhesion layer. In certain aspects, the methods may further include annealing magnetic write head after forming the heat channel to thereby increase heat conduction properties of the heat channel. In certain aspects, forming the heat channel include plating a material such as Au over a seed layer that has been deposited on the adhesion layer. In certain aspects, the adhesion layer is substantially free of oxides when the seed layer is deposited.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
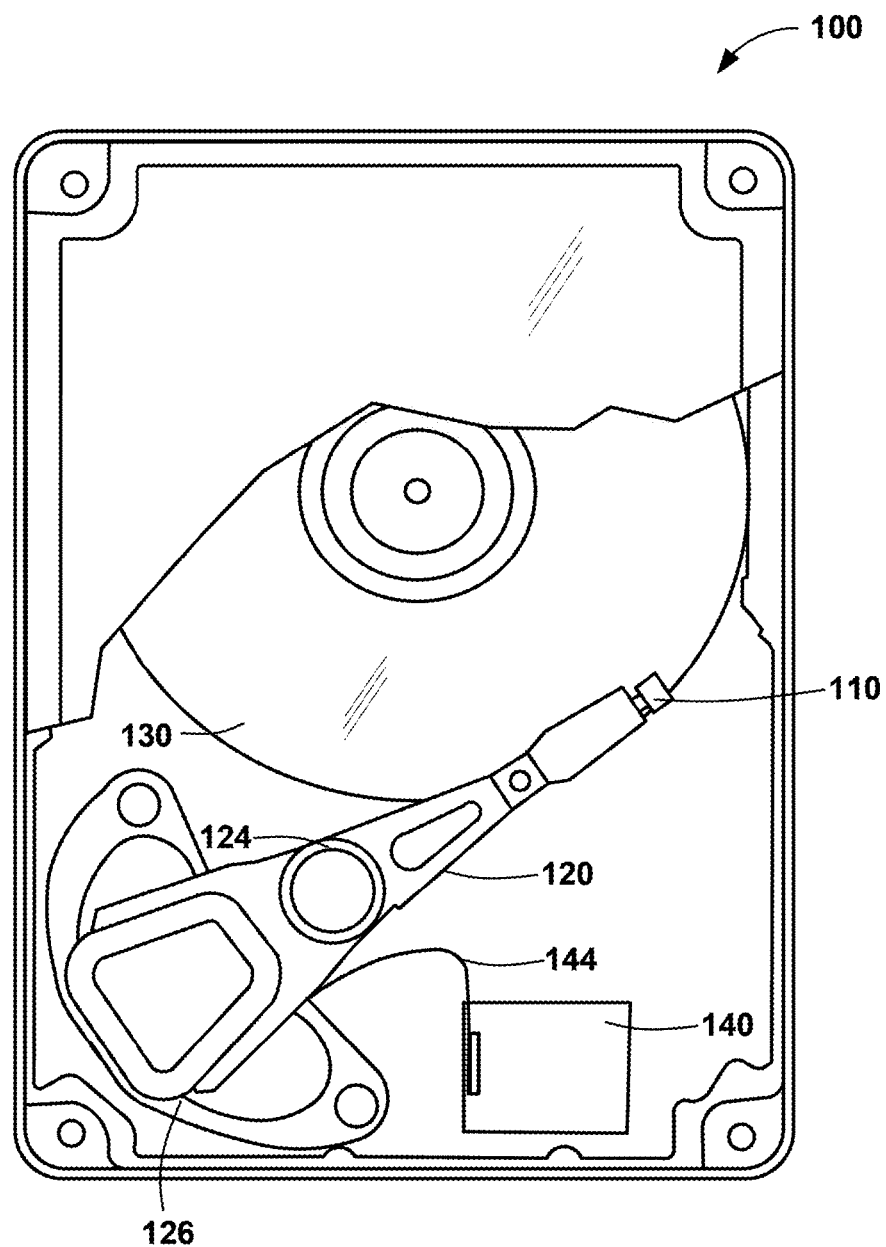
FIG. 1 is a schematic representation of a hard disk drive that may incorporate a write head constructed in accordance with the present disclosure.

The present disclosure relates to write head constructions that utilize a heat channel or heat sink to facilitate the transferring of heat away from a magnetic write pole near a media-facing surface of the write head. For example, write heads for use in heat-assisted magnetic recording (HAMR) typically direct laser light to a plasmon-generating disk of a near-field transducer (NFT), which is located at or near the media-facing surface and adjacent to a write pole tip. Generated plasmons may be focused and directed at a magnetic media surface to assist in magnetic recording. Heat-assisted and other energy-assisted magnetic recording can generate excess heat within the write head at and around the media-facing surface, including around components such as the NFT and the write pole. Forming a heat channel abutted to and/or disposed around at least one side of the write pole and/or write pole tip can effectively transmit heat away from these components. However, materials such as gold that are efficient at transmitting heat away from the write pole may adversely affect the magnetic properties of the write pole if allowed to diffuse into the write pole. As such, a diffusion barrier may be formed on the write pole and write pole tip to help prevent undesired diffusion between the heat channel and the write pole.

As discussed herein, diffusion barrier materials that are suitable for preventing undesired diffusion may undesirably provide a surface that is not conducive to heat channel adhesion, potentially resulting in delamination of the heat channel, which reduces the heat transfer efficiency and may cause other issues. Thus, the present disclosure provides for constructions in which a heat channel may be disposed around a write pole and/or write pole tip to thereby remove heat from the write pole, whereby such constructions include an adhesion layer disposed over a diffusion barrier layer on the write pole, the adhesion layer being compatible with magnetic writing functionality, being sufficiently matched in thermal expansion coefficient to the material of the heat channel, and providing a substrate conducive to robust formation of the heat channel substantially without delamination during processing, manufacturing, or normal operation of the write head. Optionally, forming the heat channel involves first depositing a seed layer that adheres to the adhesion layer, the seed layer promoting formation of the heat channel thereover.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically depicts an example hard disk drive (HDD) device 100 that includes a slider 110 that typically incorporates both a read head (or reader) and a write head (or writer), which may be collectively referred to as a recording head. Slider 110 is disposed on the end of an actuator arm 120 that is rotationally movable around a pivot 124 by use of a voice coil motor 126. The slider 110 is positioned in close proximity to the surface of magnetic media disk 130 such that the writer can write data to and the reader can read data from tracks on the magnetic media 130 as the media spins under the slider 110 by action of a spindle motor (not indicated). Controller electronics 140 may be coupled to the voice coil motor 126 and to components of the slider 110 via a flex cable 144 that connects to traces on the actuator 120. Preamp electronics (not indicated) are typically disposed close to the slider 110 for conditioning signals to and from the recording head. Controller electronics 140 may also be communicatively coupled to spindle motor 135 to thereby control the spinning of the media disk(s) 130, along with the movement of the actuator 120 and the reading and writing of data.

The internal components of HDD 100 are contained within an enclosure, which includes a cover that is shown partially cut away to reveal the internal components. A host device can communicate with HDD 100 through a standardized interface (not shown). HDD 100 can operate on any magnetic recording principle, whether that be conventional magnetic recording (CMR), shingled magnetic recording (SMR), heat-assisted magnetic recording (HAMR), or any other type of recording technique, including combinations thereof. As used in the present disclosure, the term HAMR refers broadly to any energy-assisted magnetic recording technique.

Figure 2A:
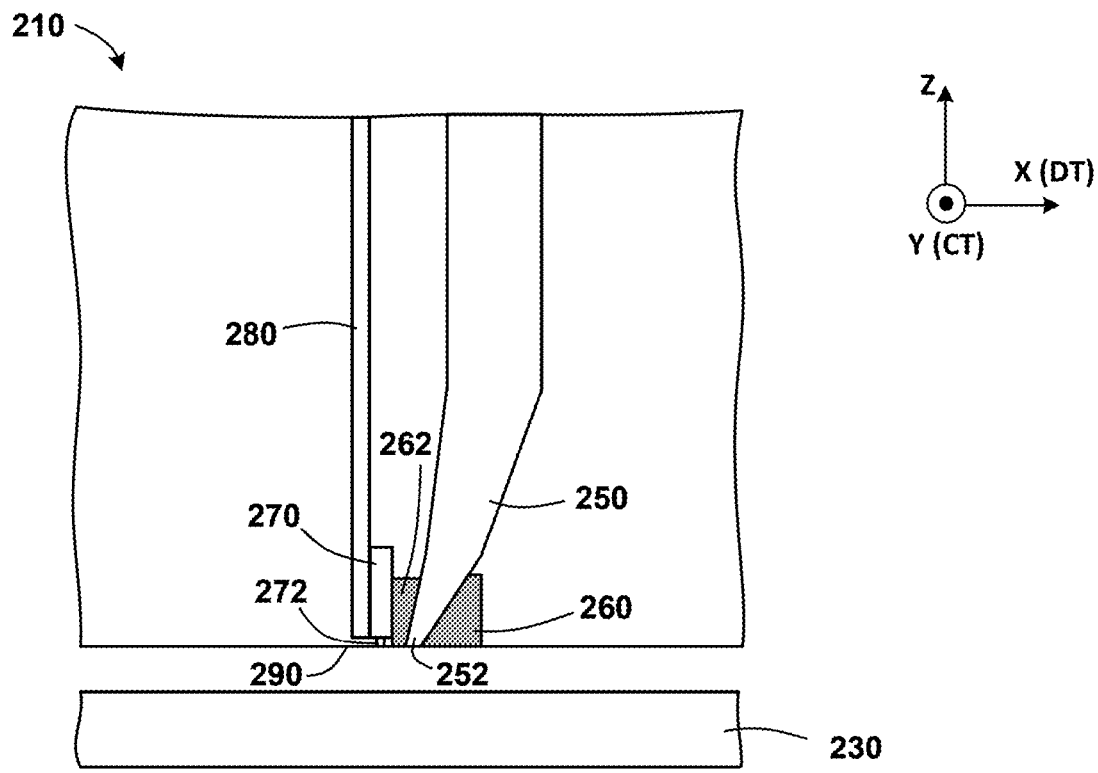
FIG. 2A is a schematic view of components of a write head in accordance with certain aspects of the present disclosure.

FIG. 2A schematically shows certain components of a magnetic write head 210 that may be used in a HAMR HDD. In typical HAMR writer constructions, write head 210 includes a write pole 250 that has a write pole tip 252 that extends to a media-facing surface 290 (which may also be referred to as an air-bearing surface, or ABS). The write pole tip 252 is designed to produce a magnetic write field that is perpendicular to the recording surface of magnetic media 230 upon activation of a magnetic write element (not shown). Write head 210 also includes a waveguide 280 that transmits electromagnetic radiation such as laser light to a near field transducer (NFT) 270, which is typically located near the leading edge of the write pole tip 252 and extends toward the ABS 290. Magnetic recording media 230 is located adjacent to and facing the ABS 290. By convention, the leading and trailing edges of components in a magnetic writer are relative to the movement of the magnetic media 230 under the write head 210. In FIG. 2A, the media 230 moves in the positive x-direction, or downtrack (DT) direction, according to the axes shown. The axes also indicate the y-direction, or crosstrack (CT) direction, which is out of the page, and the z-direction, which is orthogonal to the ABS 290. As is well-known in the art, NFT 270 may include components such as a plasmonic disk (not separately indicated), a plasmonic peg 272, and other layers or components for generating or directing plasmons, for providing or directing electromagnetic radiation, and for providing other properties such as thermal stability.

HAMR write head 210 may also include a heat channel 260 abutted to the trailing edge of the write pole 250 to thereby conduct heat away from the write pole 250, the write pole tip 252, and the NFT 270. Heat channel 260 is thus referred to as an "abutted heat channel," or AHC. Write head 210 may also include a heat sink 262 disposed between the write pole 250 and the NFT 270. In accordance with the present disclosure, various layers may be disposed between the AHC 260 and the write pole 250, such as a diffusion barrier layer, an adhesion layer, and a seed layer. These layers are described in more detail in connection with FIG. 2B. AHC 260 and heat sink 262 may be formed of any material that is a good heat conductor and that does not interfere with the magnetic writing function of the write head 210.

Figure 2B:
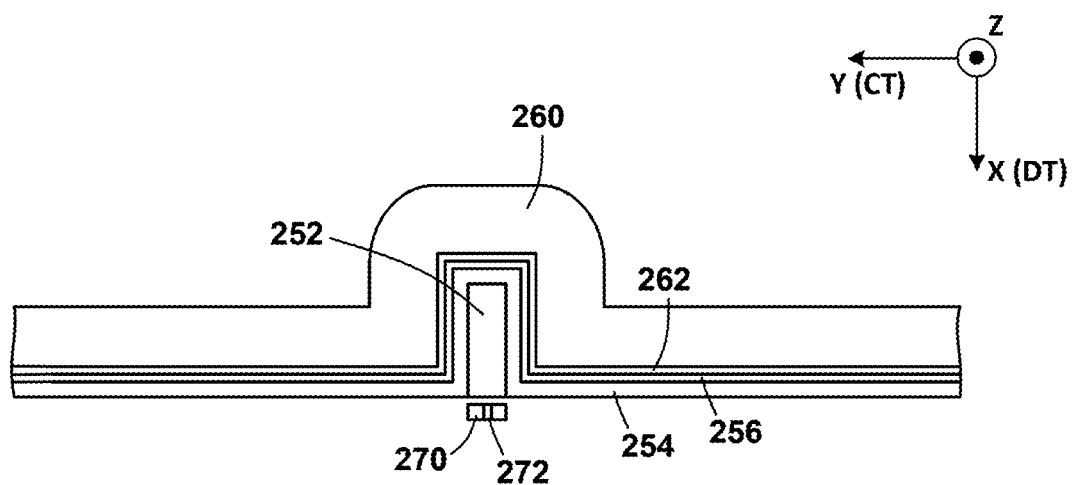
FIG. 2B is a schematic view of layers disposed between a write pole and an abutted heat channel in accordance with certain aspects of the present disclosure.

FIG. 2B shows a schematic "cross-section," as viewed from the media-facing surface, of the write pole tip 252 and AHC 260 of a HAMR write head such as write head 210 shown in FIG. 2A. The axes, indicating the downtrack (DT) and crosstrack (CT) directions in the plane of the page and the z-direction out of the page, may be used to orient the components shown in FIG. 2B relative to those shown in FIG. 2A. NFT 270 and peg 272 are shown as positioned adjacent to the leading edge of write pole tip 252. To help prevent interdiffusion of material between the AHC 260 and the write pole and write pole tip 252, a diffusion barrier layer 254 may be disposed over the write pole and write pole tip 252. The diffusion barrier layer 254 may also provide other benefits such as corrosion protection during plating processes, and is preferably "ABS safe," meaning that it can survive the chemical and mechanical processes involved in fabrication of the write head (or recording head, or slider) as well as the thermal environment at the ABS during operation of the HAMR write head. Typically, the write pole is composed of high moment magnetic alloys such as iron cobalt alloys (FeCo). The diffusion barrier layer 254 may be suitably deposited, plated, or otherwise formed from materials such as Ir, Pt, Rh, Ru, Ta, and so forth, at thicknesses of about 1 nm to 100 nm. In certain embodiments, the diffusion barrier layer 254 may be a 46 nm thick layer of Ru.

Under certain processing conditions, in fabricating components of the HAMR write head, there may be an ashing step to help remove organic materials such as residual photoresist remaining after a patterning step. Ashing involves heating during exposure to oxygen, and thus often results in the formation of an oxide in the diffusion barrier layer 254 or other layers. While oxides in the diffusion barrier layer 254 are generally not harmful to the function of the diffusion barrier layer 254, the present disclosure appreciates that the presence of oxides may inhibit adhesion of the AHC during deposition, plating, and/or subsequent annealing. As such, in accordance with various aspects of the present disclosure, an adhesion layer 256 is provided over the diffusion barrier layer 254 to thereby promote better adhesion and help reduce delamination of the AHC. The adhesion layer 256 is preferably thick enough to form a continuous layer over the diffusion barrier layer 254. The adhesion layer 256 is preferably made of materials that are ABS safe, that provide a substrate amenable to plating of the AHC, and that have a coefficient of thermal expansion (CTE) that is sufficiently similar, for example within 50%, to that of the materials of the diffusion barrier layer and/or the AHC. Similar thermal expansion properties between layers in the construction can help prevent delamination during annealing and other elevated temperature processing steps. In certain aspects, the adhesion layer 256 may be a 1 to 5 nm thick layer of Cr, Ir, Pt, Rh, Ta, Ti, Y, Zr, and so forth, and may be deposited in situ prior to seed layer deposition and plating of the AHC. In certain embodiments, and particularly when the diffusion barrier 254 layer is made of Ru, the adhesion layer 256 may be a 4 nm thick layer of Ir.

FIG. 2B further indicates a seed layer, or seed cap, 262 that may be provided to inhibit potential surface oxidation of the adhesion layer 256 during processing and to provide a good plating surface for forming the AHC 260. Seed layer 262 may be a 5 to 50 nm thick layer of Au, Ir, Pt, Rh, or Ru, for example, and is preferably provided after all ashing steps are performed. In certain embodiments, the seed layer 262 is a 20 nm thick Au layer that is formed as a plating seed for the plating of a gold AHC 260. As such, in certain embodiments, an AHC 260 may be formed by plating Au around a write pole with a trilayer construction disposed therebetween, the trilayer including a diffusion barrier layer 254 made of Ru, an adhesion layer 256 made of Ir, and a seed layer 262 made of Au. The Ru diffusion barrier layer 254 provides corrosion protection for write pole materials and other layers, and the Ir adhesion layer 256 provides for good coverage of the Ru diffusion barrier layer and a surface conducive for depositing the Au seed layer 262, thus presenting a stable and platable substrate surface for forming the AHC 260.

Figure 3:
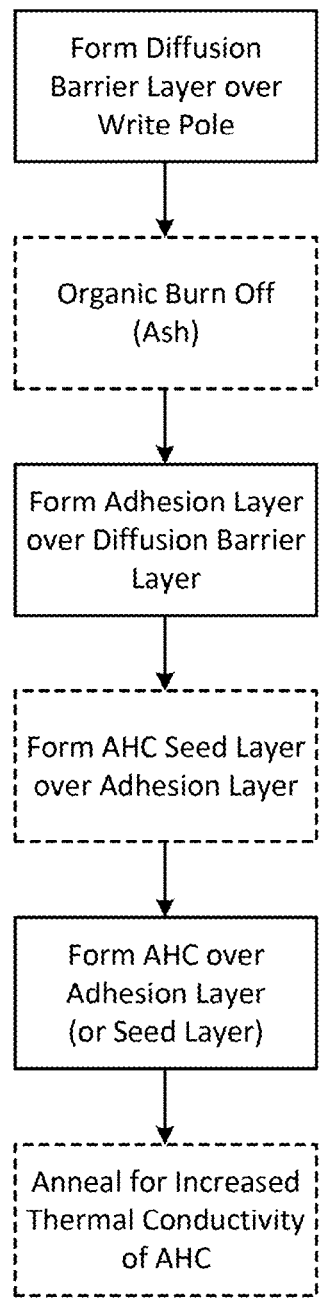
FIG. 3 is a flow chart depicting certain steps in the formation of components of a write head in accordance with certain aspects of the present disclosure.

FIG. 3 is a flow chart showing certain steps that may be used in constructing an AHC on or around a write pole in a magnetic writer in accordance with aspects of the present disclosure. A diffusion barrier layer may be formed over the write pole using any suitable means for film deposition or layer formation. Optionally, there may be an organic burn off step, or ashing, that takes place, typically in the presence of oxygen, which can lead to oxides forming in or on the diffusion barrier layer. An adhesion layer may then be formed over the diffusion barrier layer using any suitable means for film deposition or layer formation. The adhesion layer is preferably thick enough to completely cover the diffusion barrier layer. Optionally, a seed layer may be deposited over the adhesion layer to act as a seed for the plating of an AHC. Alternatively, an AHC may be formed directly on the adhesion layer, whether by deposition and/or plating techniques. In certain embodiments, it may be desired to perform an anneal step after the formation of the AHC in order to increase the thermal conductivity of the AHC, for example by removing defects, enlarging grain size, and so forth.

Preferably, the adhesion layer material has thermal expansion properties that are similar to adjacent layers or materials within the stack. For example, the adhesion layer material may have a coefficient of thermal expansion that is within 50% of that of the material of the diffusion barrier layer and/or the AHC material. This may help reduce or eliminate delamination of the AHC during any annealing step or other elevated temperature processing. An example stack may include the following materials and coefficients of thermal expansion (shown in parentheses): a write pole made of FeCo ($10 \times 10^{-6}$ $K^{-1}$), a diffusion barrier layer made of Ru ($9 \times 10^{-6}$ $K^{-1}$), and an adhesion layer made of Ir ($6 \times 10^{-6}$ $K^{-1}$), and an AHC made of Au ($14 \times 10^{-6}$ $K^{-1}$).

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A write head for magnetic recording on magnetic media positioned proximate to a media-facing surface of the write head, the write head comprising:
   a write pole including a write pole tip extending to the media-facing surface;
   a heat channel abutted to at least the write pole tip of the write pole and configured to conduct heat away from the media-facing surface;
   a diffusion barrier layer disposed between the write pole tip and the heat channel, the diffusion barrier layer configured to substantially prevent interdiffusion of materials between the write pole tip and the heat channel; and
   an adhesion layer disposed between the diffusion barrier layer and the heat channel, the adhesion layer configured to substantially prevent delamination of the heat channel during exposure of the write head to elevated temperatures,
   wherein the adhesion layer is comprised of a material having a first coefficient of thermal expansion, and the diffusion barrier layer is comprised of a material having a second coefficient of thermal expansion, the first coefficient of thermal expansion being within 50% of the second coefficient of thermal expansion.

2. The write head of claim 1, wherein the heat channel is comprised of a material having a third coefficient of thermal expansion, the first coefficient of thermal expansion being within 50% of the third coefficient of thermal expansion.

3. The write head of claim 1, wherein the write head is a HAMR write head that further comprises a near field transducer disposed adjacent to the write pole tip, the near field transducer configured to receive electromagnetic radiation transmitted by a waveguide, to convert the electromagnetic radiation into plasmons, and to direct the plasmons from the media-facing surface.

4. The write head of claim 1, wherein the heat channel is positioned at a trailing edge of the write pole.

5. The write head of claim 1, wherein the write pole and write pole tip are comprised of an alloy of iron and cobalt.

6. The write head of claim 1, wherein the diffusion barrier layer is comprised of Ir, Pt, Rh, Ru, or Ta.

7. The write head of claim 6, wherein the diffusion barrier layer includes an oxide.

8. The write head of claim 6, wherein the diffusion barrier layer has an average thickness of about 1 nm to about 100 nm.

9. The write head of claim 1, wherein the adhesion layer is comprised of Cr, Ir, Pt, Rh, Ta, Ti, Y, or Zr.

10. The write head of claim 9, wherein the adhesion layer is substantially free of oxides.

11. The write head of claim 9, wherein the adhesion layer substantially covers the diffusion barrier layer.

12. The write head of claim 9, wherein the adhesion layer has an average thickness of about 1 nm to about 5 nm.

13. The write head of claim 1, wherein the heat channel is comprised of Au.

14. The write head of claim 1, further comprising a seed layer disposed between the adhesion layer and the heat channel.

15. The write head of claim 14, wherein the seed layer is comprised of Au, Ir, Pt, Ru, or Rh.

16. The write head of claim 14, wherein the seed layer has an average thickness of about 5 nm to about 50 nm.

17. The write head of claim 1, further comprising a seed layer between the adhesion layer and the heat channel, wherein the write pole and write pole tip are comprised of FeCo, wherein the diffusion barrier is comprised of a layer of Ru including an oxide, wherein the adhesion layer comprises a layer of Ir at a thickness of about 4 nm, wherein the seed layer comprises a layer of Au at a thickness of about 20 nm, and wherein the heat channel is comprised of Au.

18. A method for making a magnetic write head, the method comprising:
   forming a diffusion barrier layer over a write pole tip that extends to a media-facing surface of the magnetic write head;
   forming an adhesion layer over the diffusion barrier layer;
   performing an ashing step prior to forming the adhesion layer;
   forming a heat channel over the adhesion layer; and
   annealing the magnetic write head after forming the heat channel to thereby increase heat conduction properties of the heat channel,
   wherein the diffusion barrier layer substantially prevents interdiffusion of materials between the write pole tip and the heat channel, and wherein the adhesion layer substantially prevents delamination of the heat channel during exposure of the write head to elevated temperatures.

* * * * *